F. A. NEIDER.
CURTAIN FASTENER.
APPLICATION FILED MAR. 25, 1918.
1,287,077.
Patented Dec. 10, 1918.
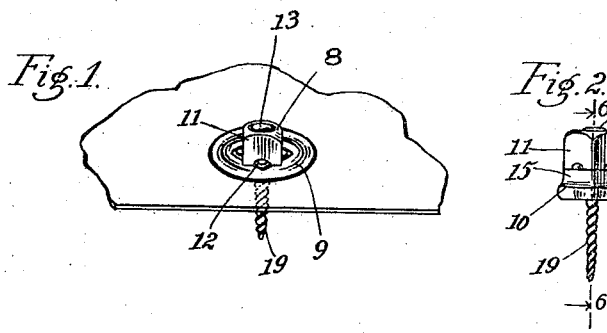
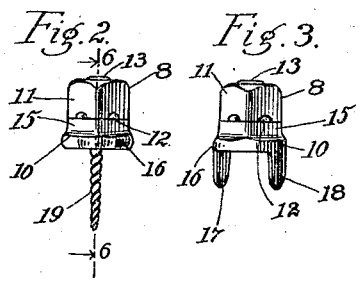
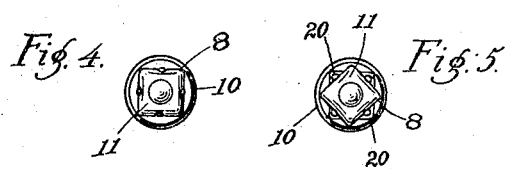
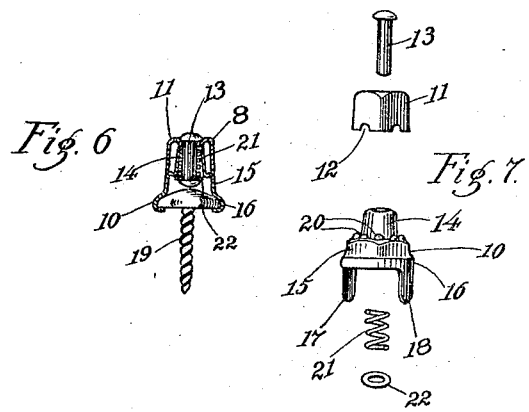
Witnesses:
E. J. Geske
W. Thornton Bogert
Inventor:
Fred A. Neider
By Walter Murray
Attorney.

UNITED STATES PATENT OFFICE.

FRED A. NEIDER, OF AUGUSTA, KENTUCKY, ASSIGNOR TO THE F. A. NEIDER COMPANY, OF AUGUSTA, KENTUCKY, A CORPORATION OF KENTUCKY.

CURTAIN-FASTENER.

1,287,077.  Specification of Letters Patent.  Patented Dec. 10, 1918.

Application filed March 25, 1918. Serial No. 224,502.

*To all whom it may concern:*

Be it known that I, FRED A. NEIDER, citizen of the United States of America, and resident of Augusta, in the county of Bracken and State of Kentucky, have invented a new and useful Improvement in Curtain-Fasteners, of which the following is a specification.

An object of my invention is to produce an improved curtain fastener which is less expensive to manufacture and which is more compact than other curtain fasteners known to me.

A further object is to produce an improved curtain fastener which can be operated with less effort and which is less easily damaged than other curtain fasteners known to me.

These and other objects are attained in the curtain fastener described in the following specification and illustrated in the accompanying drawing in which:

Figure 1 is a perspective view of a curtain fastener embodying my invention.

Fig. 2 is an elevational view of the head of my improved fastener, adapted to be secured to wood.

Fig. 3 is an elevational view of the head of my improved fastener, adapted to be secured to sheet metal or curtain material.

Fig. 4 is a plan view of the head portion of my improved fastener in socket-receiving position.

Fig. 5 is a plan view of the head portion of my improved fastener in socket-securing position.

Fig. 6 is a sectional view of the head, taken on the line 6—6 of Fig. 2.

Fig. 7 is a composite view of the head elements, separated from one another, but in the order in which they are assembled.

My improved fastener consists of head and socket members 8 and 9 respectively. Head member 8 consists of two essential portions 10 and 11, of which portion 10 forms the base and portion 11 forms a button pivotally mounted on the base. An eyelet, preferably of circular form, and having a square opening in its center to receive the square button and the square portion of the base, constitutes the socket member.

Button 11 consists of a hollow square shell preferably formed of sheet metal, having notches 12 in the bottom and an opening in the top to receive a rivet 13 which secures the elements of the head together. The base is also hollow and is preferably formed of sheet metal, an upper portion 14 thereof being of conical shape and the lower portion 15 being square to receive the square aperture of the socket, with an annular portion 16 for engaging the curtain or sheet metal when formed with retaining lugs 17 and 18 as shown in Figs. 3 and 4, or for securing the head of a nail or screw threaded pin 19 as shown in Figs. 1, 2 and 6. Around the cone and on the shoulder formed between it and the lower portion 15, I have provided a series of projections 20 which are adapted to be engaged by the notches 12 in the button. A spring 21 which surrounds rivet 13, occupies the interior of cone 14, and a washer 22 is placed on the end of rivet 13 after the spring is in place, the end of the rivet being burred to secure the parts together. Thus the button and base are secured together under the yielding tension of the spring to permit the button and base to be retained in either of the relative positions shown in Figs. 4 or 5.

To secure a curtain in position by means of my improved curtain fastener, it is but necessary to turn button 11 to the position shown in Figs. 2, 3 and 4, in which the walls of the button and base are in alinement. The eyelet is now passed over the head and onto portion 15 of the base. The button is then turned as shown in Figs. 1 and 5, to lock the socket in position.

It will be seen that in my improved fastener it requires but one eighth of a turn of the button to secure the curtain against displacement and that there are four points of contact of the bottom edge of the button with the socket. This prevents excessive rattling of the curtain and also because of the number of points of bearing of the button on the base, prevents the button being easily bent over.

An additional advantage of my improved fastener is that the use of a round eyelet is permitted, thereby reducing the cost of production over fasteners requiring eyelets of other shapes.

A further advantage is that the hollow button permits the cone-shaped extension 14 to occupy the interior of the button, and the hollow cone permits the spring to occupy the interior of the cone, thus rendering the construction one which is compact and does not extend far from the object to which it is attached, thereby largely preventing damage being done the fastener by knocking it.

Having thus described my invention, what I claim is;

1. A curtain fastener comprising head and socket portions, said head portion consisting of a hollow base, and a hollow button mounted on the base and adapted to receive a portion of the base, and means contained in the base, adapted yieldingly to retain the button on the base and in adjusted positions relatively to one another.

2. A curtain fastener comprising a square head portion and a soocket portion adapted to be retained by the head, said head consisting of a hollow button and a hollow base adapted to mount the button, said base having a button-receiving shoulder and a hollow extension adapted to occupy the button interior, a pin pivotally connecting the button and base, and extending into the extension, and a spring located within the extension and surrounding the pin, adapted yieldingly to retain the button in adjusted positions on the base, said socket consisting of an eyelet having a square aperture therein adapted to receive the head portion.

In testimony whereof, I have hereunto subscribed my name this 18th day of March, 1918.

FRED A. NEIDER.

Witnesses:
EDWIN C. TOLEMAN,
JOE H. FEDERER.

Copies of this patent may be obtained for five cents each, by addressing the "Commissioner of Patents, Washington, D. C."